(12) United States Patent
LeCounte

(10) Patent No.: US 10,824,790 B1
(45) Date of Patent: Nov. 3, 2020

(54) SYSTEM AND METHOD OF EXTRACTING INFORMATION IN AN IMAGE CONTAINING FILE FOR ENHANCED UTILIZATION AND PRESENTATION

(71) Applicant: Malcolm E. LeCounte, Riceboro, GA (US)

(72) Inventor: Malcolm E. LeCounte, Riceboro, GA (US)

( * ) Notice: Subject to any disclaimer, the term of this patent is extended or adjusted under 35 U.S.C. 154(b) by 0 days.

(21) Appl. No.: 16/423,785

(22) Filed: May 28, 2019

(51) Int. Cl.
```
G06K 9/00      (2006.01)
G06F 40/134    (2020.01)
G06T 11/60     (2006.01)
G10L 13/00     (2006.01)
```

(52) U.S. Cl.
CPC ....... *G06F 40/134* (2020.01); *G06K 9/00463* (2013.01); *G06T 11/60* (2013.01); *G10L 13/00* (2013.01)

(58) Field of Classification Search
CPC ... G06F 40/134; G06K 9/00463; G06T 11/60; G10L 13/043
USPC ........................................................ 715/202
See application file for complete search history.

(56) References Cited

U.S. PATENT DOCUMENTS

| | | | |
|---|---|---|---|
| 8,233,671 B2 | 7/2012 | Anderson et al. | |
| 9,117,445 B2 | 8/2015 | Conkie et al. | |
| 9,245,182 B2 | 1/2016 | Jania et al. | |
| 9,256,795 B1 * | 2/2016 | Gray | G06K 9/723 |
| 10,140,293 B2 | 11/2018 | Cuthbert et al. | |
| 10,180,938 B2 | 1/2019 | Johnson et al. | |
| 2005/0205671 A1 * | 9/2005 | Gelsomini | H04N 1/00312 235/384 |
| 2006/0029296 A1 * | 2/2006 | King | G06F 16/48 382/313 |
| 2009/0249189 A1 | 10/2009 | Jania et al. | |
| 2011/0267490 A1 * | 11/2011 | Goktekin | H04N 1/00307 348/222.1 |
| 2013/0050482 A1 | 2/2013 | Choi et al. | |
| 2015/0138220 A1 * | 5/2015 | Chapman | G06K 9/6828 345/589 |
| 2016/0140110 A1 | 5/2016 | Jania et al. | |
| 2017/0011732 A1 | 1/2017 | Gao | |
| 2017/0124045 A1 * | 5/2017 | Canton | G06F 3/04883 |

FOREIGN PATENT DOCUMENTS

CN 103390159 A 11/2013

* cited by examiner

*Primary Examiner* — Stephen S Hong
*Assistant Examiner* — Broderick C Anderson
(74) *Attorney, Agent, or Firm* — The Keys Law Firm PLLC

(57) ABSTRACT

A system and method for extracting text information in an image being displayed on the display screen of a mobile device and presenting the extracted information in a readily useable form. The system and method operates on a mobile device and, following the provision of a target digital image which includes a plurality of alpha numeric characters visibly disposed thereon, identifies the spatial location of the characters and converts them into machine-encoded text. A clickable overlay is then positioned over the characters which were converted and the clickable overlay is linked to the machine-encoded text corresponding to the characters it was placed over. The machine-encoded text may be converted into an auditory expression that is also linked to the relevant clickable overlay.

14 Claims, 4 Drawing Sheets

SYSTEM AND METHOD OF EXTRACTING INFORMATION IN AN IMAGE CONTAINING FILE FOR ENHANCED UTILIZATION AND PRESENTATION

BACKGROUND OF THE INVENTION

Field of the Invention

This invention relates generally to data manipulation within a display screen interface of a mobile devices and, more particularly, to the extracting, examining and presenting of text present in an image file on a display screen of a mobile device.

Description of the Prior Art

It is well established that modern handheld mobile computer devices, such as smart phones and tablets (collectively, "mobile devices" or "mobile computer devices"), are commonly used to receive, capture and view information that is presented visually on integrated optical mechanisms, such as a display screen and a camera. When visual information is provided in some formats, the visual information may be additionally modified, notated, or manipulated in other ways, or even audibly presented to a user. Often times, however, visual information may be captured or provided in formats which does not allow it to be readily manipulated. For example, when text in a photograph in a conventional file format, such as the "JPEG" (or "image/jpeg") format, is viewed (whether taken by the mobile device in which it is viewed or received from another source), textual information present therein is generally not able to be readily extracted and used for other purposes within in the mobile device. Similarly, when text in document in a conventional file format, such as the portable document format ("PDF" or "application/pdf"), textual information present therein is generally not able to be readily extracted and used for other purposes within in the mobile device. Accordingly, there remains a need for a system and method which provides for the extraction of information, particularly information in text form, present in an image containing file being displayed on the display screen of a mobile device, and which then presents the information in a manner which allows it to be readily manipulated as well as presented audibly and in other useful manners.

SUMMARY OF THE INVENTION

The present disclosure describes a system and method of extracting information in an image containing file for enhanced utilization and presentation comprising a mobile computer device configured to display images on a display screen from an electronic data file stored in memory on the mobile computer device and to play audio sound from a speaker from an electronic audio file stored in memory on the mobile computer device; an optical character recognition software module integral with the mobile computer device, wherein the optical character recognition software module causes the mobile computer device to, upon receipt of a target file which stores a target digital image which includes a plurality of alpha numeric characters visibly disposed thereon and the display of target digital image on the display screen, extract data from the target digital image while said target digital image is displayed on the display screen; wherein the extracting of data from the target digital image includes converting the plurality of alpha numeric characters into machine-encoded text and identifying the spatial location of the plurality of alpha numeric characters on the target digital image being converted into machine-encoded text; a text to speech software module integral with the mobile computer device, wherein the text to speech software module causes the mobile device to generate, from the machine-encoded text an auditory expression; an image overlay software module integral with the mobile computer device, wherein the image overlay software module causes the mobile device to insert, after spatial locations of the plurality of alpha numeric characters are identified and while said target digital image is displayed on the display screen, at least one clickable transparent overlay on the plurality of alpha numeric characters on the target digital image which were converted into machine-encoded text; a utilization and presentation software application integral with the mobile computer device, wherein the utilization and presentation software application causes the mobile device to link the at least one clickable transparent overlay to the machine-encoded text so as to associate all of the machine-encoded text, respectively, with the at least one clickable transparent overlay which was inserted at the spatial location of the plurality of alpha numeric characters from which the machine-encoded text was converted; and wherein the utilization and presentation software application additionally causes the mobile device to associate the auditory expression with the at least one clickable transparent overlay which was inserted at the spatial location of the plurality of alpha numeric characters from which the machine-encoded text used to generate the auditory expression was converted.

It is an object of this invention to provide for the extraction of information, particularly information in text form, present in an image containing file being displayed on the display screen of a mobile device and the subsequent presentation of the information in a manner which allows it to be readily manipulated as well as presented audibly and in other useful manners.

This and other objects will be apparent to one of skill in the art.

DETAILED DESCRIPTION OF THE INVENTION

Figure 1A:
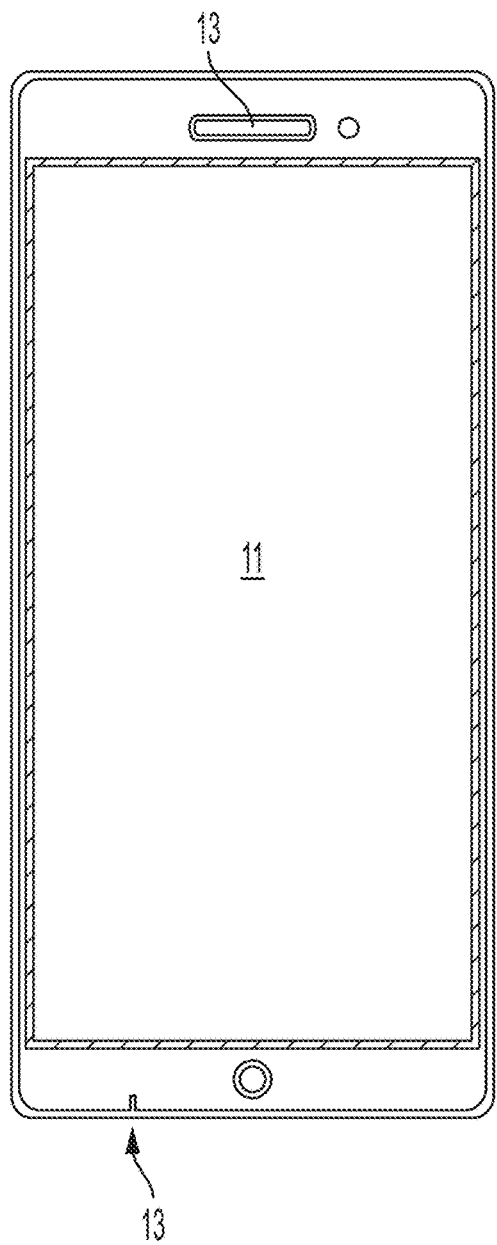
FIG. 1a is a top plan view of a mobile device suitable to perform a method of extracting information in an image containing file for enhanced utilization and presentation in accordance with the present invention.
Figure 1B:
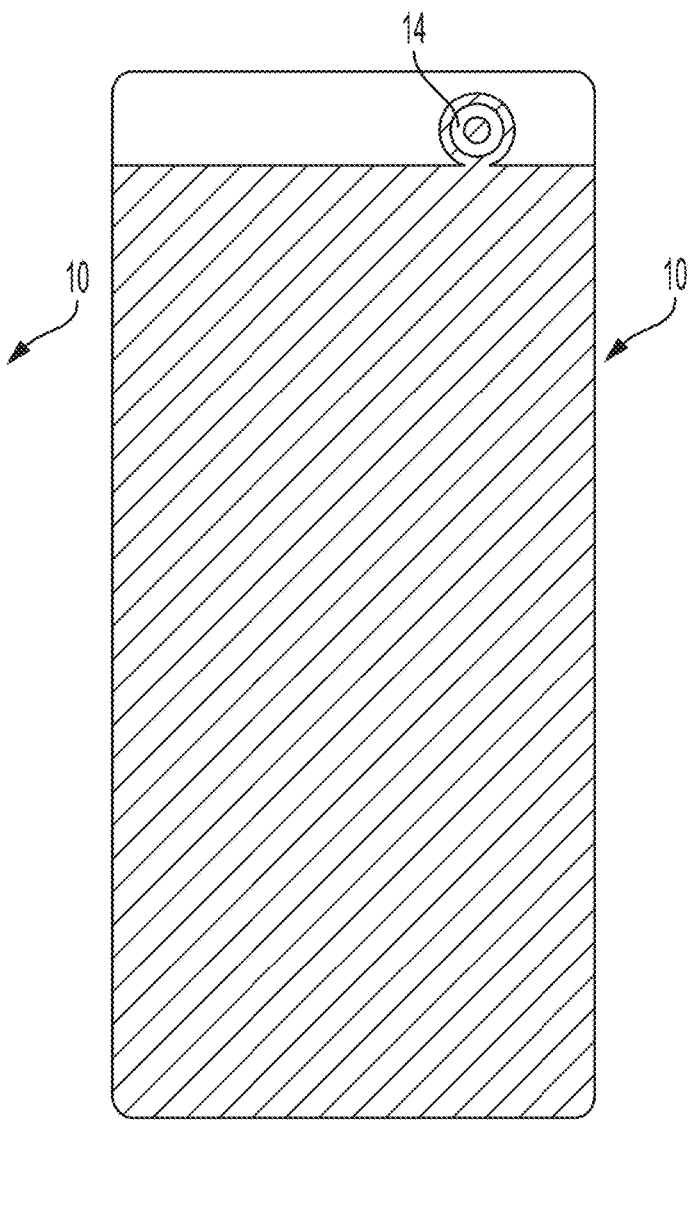
FIG. 1b is a bottom plan view of a mobile device suitable to perform a method of extracting information in an image containing file for enhanced utilization and presentation in accordance with the present invention
Figure 2A:
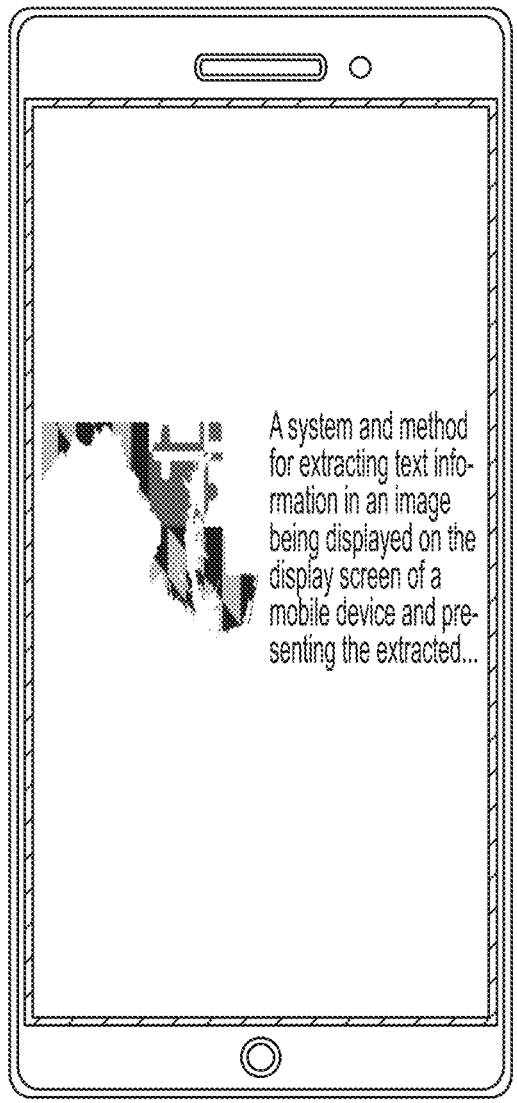
FIG. 2a is an screen shot of a mobile device suitable to perform a method of extracting information in an image containing file for enhanced utilization and presentation in accordance with the present invention displaying a conventional jpeg file containing information in a text format.
Figure 2B:
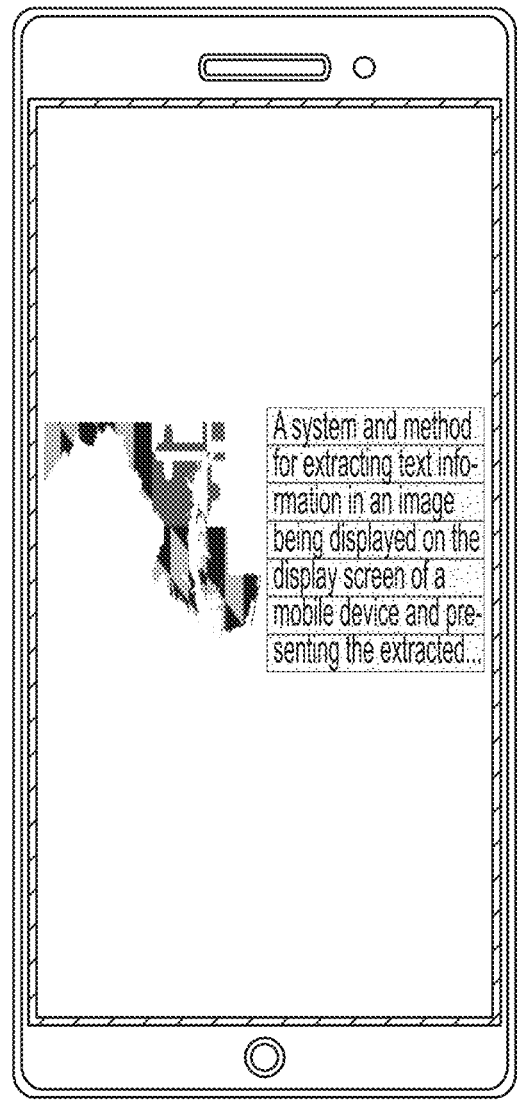
FIG. 2b is an screen shot of a mobile device suitable to perform a method of extracting information in an image containing file for enhanced utilization and presentation in accordance with the present invention displaying a conventional jpeg file containing information in a text format with an utilization overlay.

Referring now to the drawings and in particular FIGS. 1a, 1b, 2a, 2b, and 3, a system for extracting information in an image containing file for enhanced utilization and presentation defines a mobile device 10 having an integral display screen 11, a speaker 12, a microphone 13, and a camera 14. As with conventional smart phones and tablets, the mobile device 10 is defined by a housing having a plurality of interconnected internal hardware components, including a controller/central processor, a graphics processing unit, an audio card, memory, and an internal battery. It is appreciated that the display screen 11, speaker 12, microphone 13, and camera 14 are also operatively connected to the internal hardware components. Moreover, the mobile device 10 includes software which enables it to use these components to allow it to generally capture still images through its camera 14 and through screenshots of what is displayed its display screen 11 and generally display images and graphical content, which may illustrations and/or text, on its display screen 11. It is appreciated that though such capability, the mobile device 10 may display on the display screen 11 images that are captured locally or which were previously received and are stored on the memory.

The mobile device 10 further includes a utilization and presentation software application accessible to its controller. The utilization and presentation software application may be stored on, in whole or in part, internal memory and/or accessible over a network connection. The utilization and presentation software application enables the mobile device 10 to perform the steps of the method of extracting information in an image containing file for enhanced utilization and presentation.

The utilization and presentation software application has an integral an optical character recognition software module on an image present on the display screen 11 so as to recognize characters present in the image and the location of said characters and convert the recognized characters into machine-encoded text.

The utilization and presentation software application further has an integral text to speech software module which enables it to take machine-encoded text and compose audio data therefrom. It is contemplated that said audio data can be used by the audio card to play an auditory output which corresponds to the converted machine-encoded text over the speaker 12.

The utilization and presentation software application further has an integral image overlay software module which enables it to create clickable overlays on a digital image.

It is additionally contemplated that by conventional means, sounds picked up by the microphone 13 may be converted to electrical signals that are provided to the audio card and used a controlling input or a data input for the mobile device 10.

Referring now to FIGS. 1a, 1b, 2a, 2b, 3, and 4, the performance of a method of extracting information in an image containing file for enhanced utilization and presentation on a mobile device 10 and begins with the provision of a target file 40. The target file may be defined by a digital image and embodied as a JPEG file. Alternatively, the target file may be a document file, such as a PDF file, which includes a digital image. It is contemplated that the digital image of a suitable target file would necessarily include text in the form of alpha numeric characters within the image that is desired to be extracted, utilized, and presented, as exemplified by FIG. 2. It is further contemplated that the target file may be a file that has been created by the mobile device 10 and stored on the mobile device's 10 memory, such as an image file that was captured by the camera 14 of the mobile device 10 or as a screenshot of the display screen 11, or a file that was created elsewhere and transferred to the mobile device 10 and stored on the mobile device's 10 memory at some point prior to the method of extracting information in an image containing file for enhanced utilization and presentation being performed on it.

Once the target file is provided, the method of extracting information in an image containing file for enhanced utilization and presentation continues with the extraction of data from the target file 41. The step of extracting data from the target file 41 operates to identify text present in the image that defines the target file along with the spatial location of the identified text in the digital image, covert the identified text into machine-encoded text, and store the extracted data in an accompanying text reference file (which is created by the utilization and presentation software application). The optical character recognition software module is used to identify the text present in the target file and its location, and convert the identified text into machine-encoded text. This machine-encoded text, along with the location on the image that the machine-encoded text corresponds to, and possibly other information related to the machine-encoded text which may be retrieved or provided in the later steps of the method of extracting information in an image containing file for enhanced utilization and presentation may be stored in the accompanying text reference file. In this way, the text reference file enables the extracted data and related data to be directly referenced and associated with a particular location on the image. The text reference file may be stored locally on the mobile device 10 and/or stored in a network accessible location.

Figure 3:
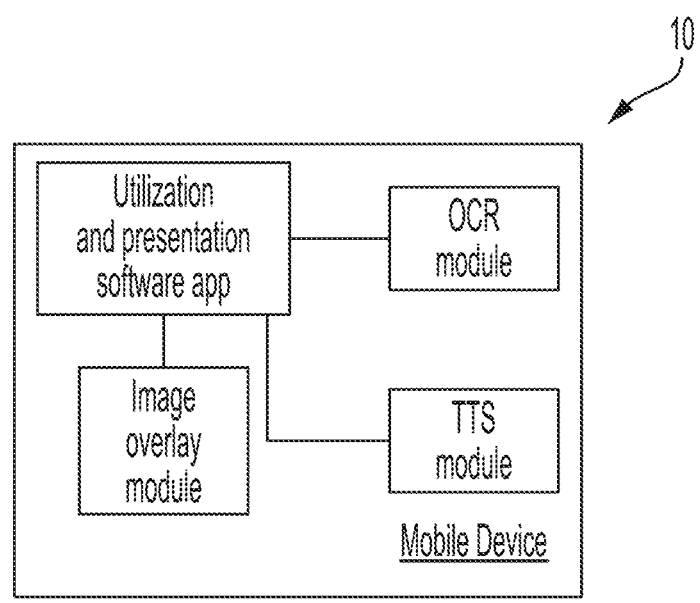
FIG. 3 is a block diagram of the operative modules of system for extracting information in an image containing file for enhanced utilization and presentation built in accordance with the present invention.
Figure 4:
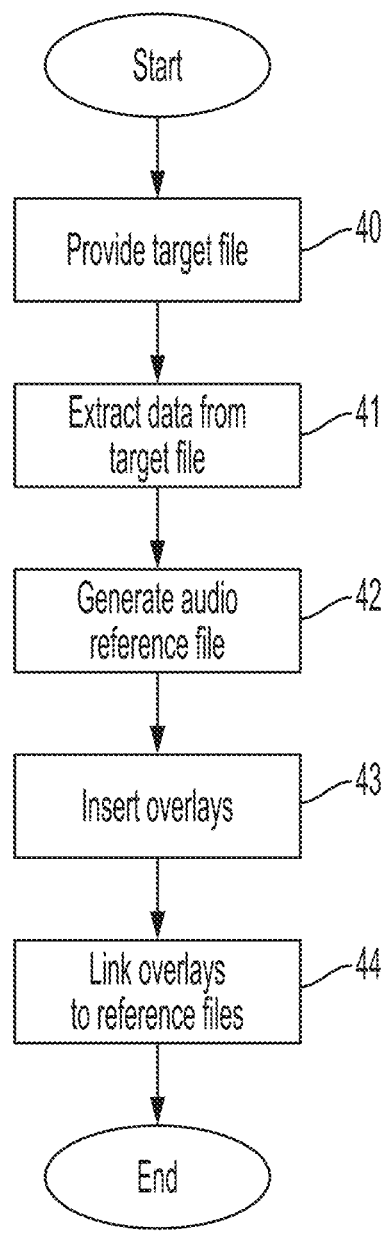
FIG. 4 shows a process for extracting information in an image containing file for enhanced utilization and presentation in accordance with the present invention.

Once data has been extracted from the image which defines the target file and added to the accompanying text reference file, the method of extracting information in an image containing file for enhanced utilization and presentation continues with the step of generating an accompanying audio reference file 42 (which is created by the utilization and presentation software application) having an auditory expression of the machine-encoded text. A text to speech software module with the utilization and presentation software application is used to convert the machine-encoded text into auditory speech. The audio reference file may be stored locally on the mobile device 10 and/or stored in a network accessible location Next, the method of extracting information in an image containing file for enhanced utilization and presentation with the step of inserting clickable transparent overlays 43. In this step, clickable transparent overlays are positioned onto the image that defines the target file, as illustrated in FIG. 3. Instructions in the image overlay software module may be used to create the clickable overlays and position them over the text in the image, based on the locations of text stored in the text reference file. Each clickable overlay may be formed as a shaded, transparent rectangle which is positioned over the text in the image which was converted and thus visually correspond to that text. It is contemplated that the overlay may be presented in any selected color or shade.

The clickable transparent overlays may be solid state overlays or overlays which appear when a pointer hovers over the image.

Then, the method of extracting information in an image containing file for enhanced utilization and presentation continues with the step of linking each clickable transparent overlay to the machine-encoded text in the text reference file which was converted from the text in the image at the location where the clickable transparent overlay is positioned, and the audio in the audio reference file which was created from that machine-encoded text 44. In the instance of a display screen 11 that provides a touch screen interface, such dual linking may associate a short tap of a given clickable transparent overlay with presenting on the display screen 11 the machine-encoded text associated with the text at location of the clickable transparent overlay in the image and a tap and hold of the clickable transparent overlay with playing on the speaker 12 the auditory speech created from the machine-encoded text associated with the text at location of the clickable transparent overlay in the image.

Once the text reference file is created, the utilization and presentation software application may scan the machine-encoded text for certain common character string formats in order to retrieve or add additional related information. For example, if upon scanning the machine-encoded text the utilization and presentation software application recognizes a postal address, it may add a hyperlink to that postal address on a local or network accessible map application. Similarly, if the upon scanning the machine-encoded text the utilization and presentation software application recognizes an email address or a website address, it may integrate a "send to" hyperlink with the noted email address or a hyperlink to the noted website, respectively. In this regard, a pop up window containing machine-encoded text generated in response to a short tap of a clickable transparent overlay may include hyperlinks for certain text.

Similarly, once the text reference file is created, the utilization and presentation software application may scan the machine-encoded text for words in a secondary language and retrieve (from a local or network based translation application) and provide a translation of the words. Along the same lines, the utilization and presentation software application may retrieve (from a local or network based dictionary application) and provide dictionary definitions of words in the machine-encoded text. Further, it is appreciated that once the machine-encoded text is present in the text reference file, it can be notated or modified in the conventional manners for editable text, including highlighting, spell checking, making letters/words bold, and so forth.

Once the text reference file and audio reference files are created, a user may use the input interfaces of the mobile device 10 to add additional comments or notes to these files. For example, a user may use a tactile input interface, like a keyboard (physical or virtual) to add typed information that can be saved to the text reference file (when it is active on the display screen 11). Similarly, a user may use the microphone 13 to add auditory information to that can be saved to the audio reference file.

It is contemplated that a user may temporarily resize a digital image on the display screen 11 prior to running the utilization and presentation software application so as to allow for more precise selection of the text to be extracted, utilized and presented.

In an embodiment, the utilization and presentation software application may operate as a background process on any image containing text that is shown on the display screen 11 for more than a predetermined time threshold (such as 3 seconds).

It is contemplated that the modified image file, the accompanying text reference file, and/or the accompanying audio reference file may be printed, emailed or otherwise transmitted to another device as desired by a user through normal operation of the mobile device. Further, the utilization and presentation software application may operate to time and date stamp all activity performed on images and reference files.

In an embodiment, the utilization and presentation software application may allow a user to customize the sound of the auditory output.

In an embodiment, the utilization and presentation software application may store the data in the in the text reference files and/or the audio reference files in the metadata of the target file.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of extracting information in an image containing file for enhanced utilization and presentation, comprising the steps of:

providing a mobile computer device configured to at least display images on a display screen from an electronic data file stored in memory on the mobile computer device;

providing a target file which stores a target digital image to said mobile computer device so as to allow said mobile computer device to selectively cause the target digital image to be displayed on the display screen, wherein said digital image includes a plurality of alpha numeric characters visibly disposed thereon;

extracting, while said target digital image is displayed on the display screen, data from the target digital image, wherein the step of extracting includes converting the plurality of alpha numeric characters into machine-encoded text and identifying the spatial location of the plurality of alpha numeric characters on the target digital image being converted into machine-encoded text;

generating from the machine-encoded text an auditory expression, wherein the mobile computer device additionally configured to play audio sound from a speaker from an electronic audio file stored in memory on the mobile computer device;

inserting, while said target digital image is displayed on the display screen, at least one clickable transparent overlay on the plurality of alpha numeric characters on the target digital image which were converted into machine-encoded text;

linking the at least one clickable transparent overlay to the machine-encoded text so as to associate all of the machine-encoded text, respectively, with the at least one clickable transparent overlay which was inserted at the spatial location of the plurality of alpha numeric characters from which the machine-encoded text was converted;

wherein the step of linking additionally includes associating the auditory expression with the at least one clickable transparent overlay which was inserted at the spatial location of the plurality of alpha numeric characters from which the machine-encoded text used to generate the auditory expression was converted; and wherein the at least one clickable transparent overlay is configured to, in response to a first discrete tactile input on the mobile computer device, cause the presentation on the display screen of the machine-encoded text linked to the at least one clickable transparent overlay and, in response to a second discrete tactile input on the mobile computer device, cause the playing on the speaker of the auditory expression associated with the at least one clickable transparent overlay.

2. The method of extracting information in an image containing file for enhanced utilization and presentation of claim 1, wherein the step of generating includes creating an audio reference file to be associated with the target digital image and storing the auditory expression in the audio reference file.

3. The method of extracting information in an image containing file for enhanced utilization and presentation of claim 2, wherein the audio reference file is editable.

4. The method of extracting information in an image containing file for enhanced utilization and presentation of claim 1, wherein the step of extracting includes creating a text reference file to be associated with the machine-encoded text and the spatial location identification and storing the machine-encoded text and the spatial location identification in the text reference file.

5. The method of extracting information in an image containing file for enhanced utilization and presentation of claim 4, wherein the text reference file is editable.

6. The method of extracting information in an image containing file for enhanced utilization and presentation of claim 1, wherein the at least one clickable transparent overlay is a solid state overlay.

7. The method of extracting information in an image containing file for enhanced utilization and presentation of claim 1, wherein the step of providing a target file which stores a target digital image to said mobile computer device includes selectively resizing the target digital image to reduce how much of the target digital image is displayed on the display screen and the step of extracting data from the target digital image only converts the plurality of alpha numeric characters present on the display screen.

8. A system of extracting information in an image containing file for enhanced utilization and presentation, comprising:
   a mobile computer device configured to display images on a display screen from an electronic data file stored in memory on the mobile computer device and to play audio sound from a speaker from an electronic audio file stored in memory on the mobile computer device;
   an optical character recognition software module integral with the mobile computer device, wherein the optical character recognition software module causes the mobile computer device to, upon receipt of a target file which stores a target digital image which includes a plurality of alpha numeric characters visibly disposed thereon and the display of target digital image on the display screen, extract data from the target digital image while said target digital image is displayed on the display screen;
   wherein the extracting of data from the target digital image includes converting the plurality of alpha numeric characters into machine-encoded text and identifying the spatial location of the plurality of alpha numeric characters on the target digital image being converted into machine-encoded text;
   a text to speech software module integral with the mobile computer device, wherein the text to speech software module causes the mobile device to generate, from the machine-encoded text an auditory expression;
   an image overlay software module integral with the mobile computer device, wherein the image overlay software module causes the mobile device to insert, after spatial locations of the plurality of alpha numeric characters are identified and while said target digital image is displayed on the display screen, at least one clickable transparent overlay on the plurality of alpha numeric characters on the target digital image which were converted into machine-encoded text;
   a utilization and presentation software application integral with the mobile computer device, wherein the utilization and presentation software application causes the mobile device to link the at least one clickable transparent overlay to the machine-encoded text so as to associate all of the machine-encoded text, respectively, with the at least one clickable transparent overlay which was inserted at the spatial location of the plurality of alpha numeric characters from which the machine-encoded text was converted;
   wherein the utilization and presentation software application additionally causes the mobile device to associate the auditory expression with the at least one clickable transparent overlay which was inserted at the spatial location of the plurality of alpha numeric characters from which the machine-encoded text used to generate the auditory expression was converted; and
   wherein the at least one clickable transparent overlay is configured to, in response to a first discrete tactile input on the mobile computer device, cause the presentation on the display screen of the machine-encoded text linked to the at least one clickable transparent overlay and, in response to a second discrete tactile input on the mobile computer device, cause the playing on the speaker of the auditory expression associated with the at least one clickable transparent overlay.

9. The method of extracting information in an image containing file for enhanced utilization and presentation of claim 8, wherein the step of generating includes creating an audio reference file to be associated with the target digital image and storing the auditory expression in the audio reference file.

10. The method of extracting information in an image containing file for enhanced utilization and presentation of claim 9, wherein the audio reference file is editable.

11. The method of extracting information in an image containing file for enhanced utilization and presentation of claim 8, wherein the step of extracting includes creating a text reference file to be associated with the machine-encoded text and the spatial location identification and storing the machine-encoded text and the spatial location identification in the text reference file.

12. The method of extracting information in an image containing file for enhanced utilization and presentation of claim 11, wherein the text reference file is editable.

13. The method of extracting information in an image containing file for enhanced utilization and presentation of claim 8, wherein the at least one clickable transparent overlay is a solid state overlay.

14. The method of extracting information in an image containing file for enhanced utilization and presentation of claim 8, wherein the utilization and presentation software application additionally causes the mobile device to integrate hyperlinks for any email addresses and website addresses in the machine-encoded text.

* * * * *